United States Patent [19]

Barish et al.

[11] Patent Number: 5,281,248
[45] Date of Patent: Jan. 25, 1994

[54] VAD PROCESS IMPROVEMENTS

[75] Inventors: Eric L. Barish, Raleigh; David E. Schoonmaker, Cary, both of N.C.

[73] Assignee: Litespec, Inc., Research Triangle Park, N.C.

[21] Appl. No.: 20,951

[22] Filed: Feb. 22, 1993

[51] Int. Cl.$^5$ .......................................... C03B 37/023
[52] U.S. Cl. .................................... 65/3.12; 65/18.2; 65/60.8
[58] Field of Search ..................... 65/3.12, 18.2, 60.5, 65/60.8

[56] References Cited

U.S. PATENT DOCUMENTS

| | | | |
|---|---|---|---|
| 4,367,085 | 1/1983 | Suto et al. | 65/18.2 |
| 4,618,354 | 10/1986 | Suda et al. | 65/2 |
| 4,915,716 | 4/1990 | Monroe et al. | 65/2 |
| 5,207,813 | 5/1993 | Danzuka et al. | 65/3.12 |
| 5,211,732 | 5/1993 | Abbott et al. | 65/3.12 |

OTHER PUBLICATIONS

"Double-Flame VAD Process for High-Rate Optical Preform Fabrication," H. Suda et al. *Electronics Letters*, vol. 21, No. 1, Jan. 3, 1985, pp. 29-30.
"Optical Fiber Communications," B. K. Tariyal et al., *Encyclopedia of Physical Science and Technology*, vol. 11, Academic Press, 1992, pp. 612-621.

*Primary Examiner*—Robert L. Lindsay
*Attorney, Agent, or Firm*—Roderick B. Anderson

[57] ABSTRACT

In a VAD method for making optical fiber preforms, the yield is increased by terminating or significantly reducing the supply of glass raw material to the torch (24) just after glass jacket soot (23, FIG. 4) has been deposited at the bottom end of the glass rod (20). The fuel supply to the torch is maintained, however, and the flame continues to be projected from the torch toward the deposited soot boule (23). The rate of vertical movement of the glass rod is increased until the flame is directed at the bottom end (27') of the soot boule. The flame is then allowed to dwell for a sufficient period to increase significantly the temperature of the bottom end of the soot boule and to consolidate partially the bottom end of the soot boule. This has the effect of containing the soot and countering the effects of gravity on the delicate soot boule that might otherwise cause it to crack.

12 Claims, 2 Drawing Sheets

VAD PROCESS IMPROVEMENTS

TECHNICAL FIELD

This invention relates to methods for making optical fiber and, more particularly, to methods for depositing jacket soot on a glass rod by the VAD process.

BACKGROUND OF THE INVENTION

One of the steps in making glass optical fiber by the vapor axial deposition (VAD) method is the step of depositing glass particles or "jacket soot" on a glass core rod. This is done by supplying to a torch glass raw material and fuel such that the torch projects the vaporized glass raw material within a flame toward the glass rod. The flame causes the raw material to react such as to deposit glass particles or glass soot on the core rod. The core rod typically extends vertically with the initial deposition at its upper end. It is then moved vertically and rotated so that glass soot is deposited along its entire length and circumference. After deposition, the soot surrounding the core rod or the "soot boule" is consolidated or sintered in a furnace to form a glass preform. The preform is typically elongated and thereafter is used as a source from which optical fiber is drawn.

Optical fiber is very widely used and, as a consequence, significant efforts have been made to reduce production costs. The step of making the jacket layer as described above can result in cracking of the soot boule, which may render the entire structure useless. There is therefore a continuing need for increasing the yield of methods for making optical fiber preforms without significantly increasing the cost or the time required for making such preforms.

SUMMARY OF THE INVENTION

In a VAD method for making optical fiber preforms as generally described above, the yield is increased by terminating or significantly reducing the supply of glass raw material to the torch just after glass jacket soot has been deposited at the bottom end of the glass rod. The fuel supply to the torch is maintained, however, and the flame continues to be projected from the torch toward the deposited soot boule. The rate of vertical movement of the glass rod is increased until the flame is directed at the bottom end of the soot boule. The flame is then allowed to dwell for a sufficient period to increase significantly the temperature of the bottom end of the soot boule and to consolidate partially the bottom end of the soot boule. This has the effect of containing the soot and countering the effects of gravity on the delicate soot boule that might otherwise cause it to crack.

These and other objects, features and benefits of the invention will be better understood from a consideration of the following detailed description taken in conjunction with the accompanying drawing.

DETAILED DESCRIPTION

Figure 1:
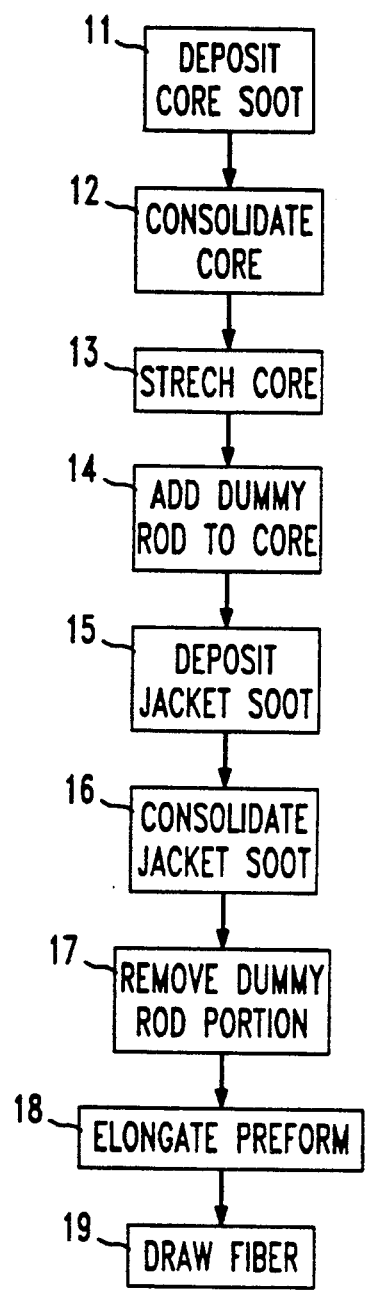
FIG. 1 is a flow chart diagram of a method for making optical fiber in accordance with the prior art.

Referring now to FIG. 1, the first step in making drawn optical fiber in accordance with the prior art vapor axial deposition (VAD) process is the step 11 of depositing glass core soot on a glass seed element. This is done typically through the use of a pair of burners or torches which react vaporized raw material to cause glass particles to collect on the seed element. In step 12, the core glass is consolidated or sintered in a furnace to make a solid glass core element. In step 13, the core is stretched to be in the shape of a cylindrical glass rod. In step 14, a dummy rod is added to an end of the core to extend its length in order to assure completeness of jacket coverage. In step 15, jacket soot is deposited on the core rod and the dummy rod by the VAD process. This typically is accomplished by a single burner or torch directing glass raw material within a flame toward the glass rod to create a deposited jacket soot boule. In step 16, the jacket soot is consolidated in a furnace, and in step 17, the portion of the consolidated rod that corresponds to the dummy rod portion of step 14 is removed to form a preform comprising the core surrounded by the jacket. In step 18, the jacketed preform is elongated to form the preform from which glass optical fiber having core and clad layers is drawn as illustrated in step 19. The clad layer corresponds to the deposited jacket soot and normally has a different refractive index from that of the core as is required for lightwave transmission by the optical fiber.

It is to be understood that FIG. 1 merely summarizes the process for making glass optical fiber; for conciseness, and because the process is known in the art, various other steps such as profiling the glass at various stages and applying and removing various glass handle portions have not been described.

Figure 2:
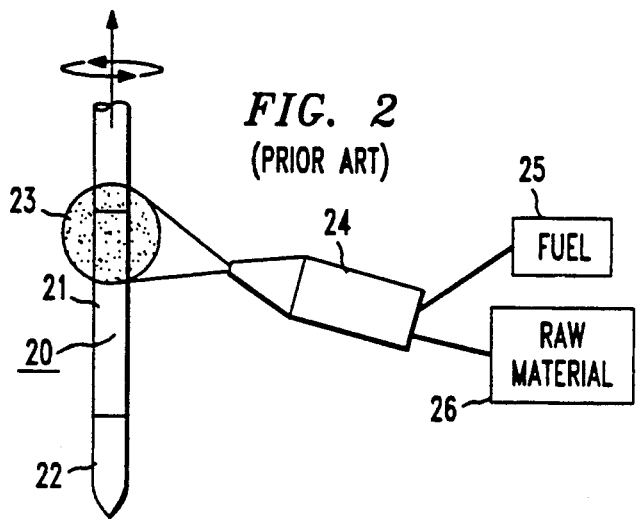
FIG. 2 is a schematic diagram of a method for making a jacket portion of an optical fiber preform in accordance with the prior art.
Figure 3:
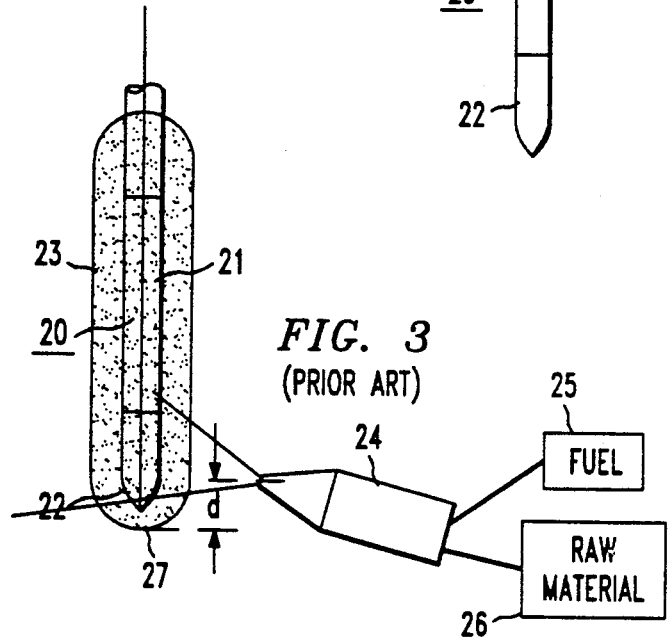
FIG. 3 is a view illustrating the method of FIG. 2 at a subsequent stage of fabrication.

The invention is an improvement in step 15 of FIG. 1, that of depositing jacket soot, and for this reason, step 15 is described in more detail in FIGS. 2 and 3. Referring to FIG. 2, there is shown a glass rod 20 comprising a glass core rod 21 on which a dummy rod 22 has been attached. Glass soot 23 is deposited on the rod 20 by a torch or burner 24 through which is directed fuel from a source 25 and glass raw material from a source 26. The torch is typically of the type known as a double flame burner in which vaporized raw material is projected between an inner flame portion and an outer flame portion.

The torch flame is produced by the combustion of fuel which may, for example, be hydrogen and oxygen. The glass raw material may be silicon tetrachloride ($SiCl_4$) which reacts within the flame to produce glass particles of silicon dioxide ($SiO_2$). Double burner torches are described, for example, in the U.S. patent of Suda et al., U.S. Pat. No. 4,618,354, granted Oct. 31, 1986 and the U.S. patent of Monroe et al., U.S. Pat. No. 4,915,716, granted Apr. 10, 1990. The core portion 21 may typically be three hundred fifty to six hundred fifty millimeters long, and the dummy portion 22 may be one hundred to one hundred twenty millimeters long.

As the glass soot is being deposited, the rod 20 is pulled vertically upwardly and simultaneously rotated as indicated by the arrows near the top of the glass rod. As a consequence, the glass soot 23 is deposited along and around the entirety of the glass core 21 and the glass dummy portion 22. As illustrated in FIG. 3, when a position is reached at which the torch 24 is a distance d from the bottom of the soot boule 23, typically eighty millimeters, the deposited soot constitutes a soot boule that completely covers the dummy portion 22, and the flame and raw material projected from torch 24 are ramped down or terminated. The bottom end 27 of the soot boule is typically heated to a temperature maximum of 1060° F. After completion of the operation illustrated in FIG. 3, the jacket soot boule is consolidated as shown by step 16 of FIG. 1. After consolidation, the portion of the glass adhering to the dummy portion 22 is removed as indicated by step 17 of FIG. 1. The dummy portion 22 never constitutes part of the useful glass preform, its only function being to maximize the portion of core 21 that can eventually be used as preform glass.

A problem with which the invention is concerned is the tendency of jacket soot boule 23 to crack at the completion of jacket deposition. Such cracks may extend longitudinally along a length of the soot boule or may extend in a generally horizontal direction and may cause the soot boule to vertically slide with respect to the rod 20.

Figure 4:
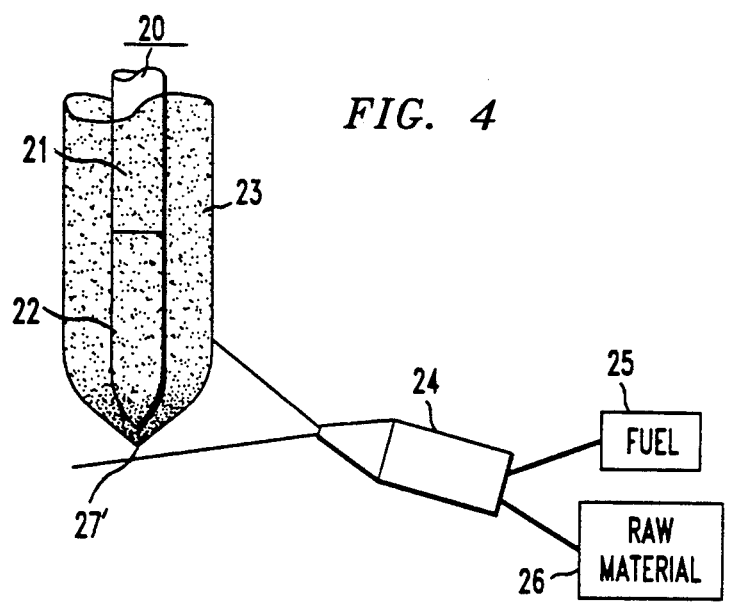
FIG. 4 illustrates a method for making a jacket portion in accordance with the invention.

In accordance with the invention, this problem is solved by ramping down or terminating the supply of raw material to torch 24 when the torch is in the position shown in FIG. 3, but continuing the supply of the fuel and therefore maintaining the flame projected from the torch. The glass rod 20 continues to be raised and rotated until the bottom of the soot boule reaches the same level as that of the torch 24 as shown in FIG. 4. By continuing the flame without the supply of raw material, the temperature of the bottom part of the soot boule 23 is significantly increased over the temperature it has in the position shown in FIG. 3 at which both the flame and raw material are conventionally terminated. This increase in temperature, without the deposition of additional glass soot, causes a partial consolidation or sintering of the bottom portion 27' of soot boule 23. This results in a densification of the bottom portion of the soot boule 23 which provides greater structural resistance to the effects of gravity and therefore combats the tendency of the soot boule to crack.

It is of course desirable to minimize the length of time taken to employ the improvements shown in FIG. 4. The typical vertical speed of the glass rod during deposition is one hundred millimeters per hour. When the torch 24 is in the position shown in FIG. 3, the raw material is cut off, and we have found that the vertical speed of the glass rod 20 can be significantly increased to a rate, for example, of two hundred millimeters per hour. When the relative position of the glass torch 24 reaches the lower tip of the boule as shown in FIG. 4, the vertical movement is then preferably stopped and the torch flame is allowed to dwell on the tip 27' for approximately two minutes. This heats the tip 27' to a temperature typically of 1390° to 1750° F., which is significantly higher than the maximum tip temperature of 1060° F. of FIG. 3. Thus, a higher tip temperature is obtained for densification of the soot boule without changing the fuel supply, but simply by cutting off the raw material supply. The combination of an increase in glass rod vertical speed, together with a short dwell time at the tip 27', has been found to minimize the added time required by the improvement while giving the desired densification to prevent cracking. The total time for depositing the jacket soot in accordance with the invention is typically three hundred eighty-four minutes which compares with three hundred sixty minutes without the invention.

Various modifications of the invention can be made. The process that has been described yields a soot boule having a lower portion 27' with a visibly harder and more dense lower portion 27' than the remainder of the boule; the lower portion has been described as an "egg shell" as compared to the porous remainder of the delicate soot boule 23. An important aspect is that, with the raw material cut off, the lower portion should be heated to a sufficiently high temperature to permit visible densification. Methods other than that specifically described could be used. For example, the supply of fuel could be increased to increase flame temperature, and various rates of vertical movement other than those described could be used. The improvement has increased the yield of jacket soot boules by about ten percent by substantially completely eliminating the cracking problem that conventionally occurs during many of the prior art jacket soot processes.

We claim:

1. A VAD method for making optical fiber preforms comprising the steps of:

supplying to a torch glass raw material and a fuel, and projecting glass raw material within a flame from said torch;

directing the flame at a vertically extending glass rod having top and bottom ends, the flame temperature and glass raw material projected being appropriate to cause glass particles to collect on the glass rod to form a glass soot boule;

the torch initially being near a top end of the glass rod;

moving the glass rod with respect to the torch in an axial vertically upward direction to allow substantially the entire length thereof to be covered with deposited glass particles;

when the bottom end of the glass rod reaches a position near the torch, significantly reducing the supply of the glass raw material to the torch while maintaining the fuel supply to the torch and the flame projected from the torch, thereby to increase the temperature of the soot boule near the bottom end of the glass rod and to make the density of the soot boule near the bottom end thereof greater than the average soot density of the soot boule.

2. The method of claim 1 wherein:

the glass rod comprises a core rod portion and a dummy rod portion extending axially downwardly from the core rod portion.

3. The method of claim 2 wherein:

the raw material and flame are projected from a tip end of the torch;

the glass particles are deposited both vertically above and below the tip end of the torch on the glass rod;

and the step of reducing the supply of the glass raw material occurs when the tip of the torch is above the bottom end of the glass rod.

4. The method of claim 3 wherein:

after the glass rod has been raised to a vertical location at which the bottom end thereof is at about the same height as the tip of the torch, and after the significant reduction in the supply of glass raw material, the vertical movement of the glass rod is terminated, and the flame is allowed to dwell at a position corresponding to the bottom end of the glass rod, thereby to increase further the temperature of the bottom end of the soot boule.

5. The method of claim 1 wherein:
the significant reducing step comprises a complete termination of the supply of glass raw material to the torch.

6. The method of claim 5 wherein:
after the termination of the glass raw material supplied to the torch, the vertical movement of the glass rod is increased until the bottom of the soot boule is approximately the same height as the torch, whereafter the flame is allowed to dwell on the bottom end of the soot boule, thereby to raise the temperature of the soot boule.

7. The method of claim 6 wherein:
the flame is allowed to dwell for a sufficient length of time to increase the temperature of the bottom end of the soot boule by more than about three hundred degrees Fahrenheit from its temperature at the time the glass raw material is terminated.

8. A method for making optical fiber comprising the steps of: depositing core soot on a glass body; consolidating the core soot to make a glass core; stretching the core to make a rod; depositing jacket soot on the rod comprising the steps of supplying to a torch glass raw material and a fuel, and projecting vaporized glass raw material within a flame from said torch; directing the flame at the rod near a top end thereof and vertically moving the rod upwardly to cause glass particles to collect on the glass rod; consolidating the glass particles on the core to make a glass preform; and drawing optical fiber from the glass preform; wherein the improvement comprises:
after glass particles have been deposited on the bottom end of the glass rod, terminating the supply of glass raw material to the torch while maintaining the flame from the torch, and using the flame to heat the glass particles at the bottom end of the glass rod for a sufficient length of time and at a sufficiently high temperature to partially consolidate said glass particles at the bottom end of the glass rod.

9. The method of claim 8 wherein:
the glass rod comprises a dummy portion attached to a core rod portion made from consolidating core soot, the dummy portion having a tapered bottom end;
and the glass raw material supply is terminated when the tapered end reaches approximately the same vertical height as that of the torch.

10. The method of claim 8 wherein:
the flame is allowed to dwell for a sufficient length of time to increase the temperature of the bottom of the glass rod by more than about three hundred degrees Fahrenheit from its temperature at the time that the glass raw material is terminated.

11. The method of claim 8 wherein:
as the glass rod is moved upwardly, it is rotated.

12. The method of claim 11 wherein:
the glass particles at the bottom end of the glass rod are heated to a temperature of 1390° to 1750° F.

* * * * *